United States Patent
Fellner et al.

(10) Patent No.: US 11,995,517 B1
(45) Date of Patent: May 28, 2024

(54) QUANTUM ALGORITHMS OF LOGICAL QUBITS IN A QUANTUM SYSTEM WITH PHYSICAL QUIBITS ALLOWING ERROR CORRECTION AND INCREASED INTERQUBIT-CONNECTIVITY

(71) Applicant: Parity Quantum Computing GmbH, Innsbruck (AT)

(72) Inventors: Michael Fellner, Wörgl (AT); Anette Messinger, Kematen in Tirol (AT); Kilian Ender, Innsbruck (AT); Wolfgang Lechner, Rum (AT)

(73) Assignee: PARITY QUANTUM COMPUTING GMBH, Innsbruck (AT)

( * ) Notice: Subject to any disclaimer, the term of this patent is extended or adjusted under 35 U.S.C. 154(b) by 15 days.

(21) Appl. No.: 18/094,065

(22) Filed: Jan. 6, 2023

(51) Int. Cl.
| | |
|---|---|
| *G06N 10/70* | (2022.01) |
| *G06N 10/20* | (2022.01) |
| *G06N 10/40* | (2022.01) |
| *G06N 10/60* | (2022.01) |

(52) U.S. Cl.
CPC ............ *G06N 10/70* (2022.01); *G06N 10/20* (2022.01); *G06N 10/40* (2022.01); *G06N 10/60* (2022.01)

(58) Field of Classification Search
None
See application file for complete search history.

(56) References Cited

U.S. PATENT DOCUMENTS

| | | | | |
|---|---|---|---|---|
| 2004/0000666 | A1* | 1/2004 | Lidar | H10N 69/00 257/31 |
| 2006/0179029 | A1* | 8/2006 | Vala | G06N 10/00 706/62 |
| 2021/0117843 | A1* | 4/2021 | Delfosse | H03M 13/6575 |
| 2022/0156630 | A1* | 5/2022 | Schuster | H10N 69/00 |
| 2023/0206110 | A1* | 6/2023 | Jiang | H04B 10/70 714/10 |
| 2023/0370069 | A1* | 11/2023 | Amin | G06N 10/70 |

OTHER PUBLICATIONS

Fellner et al., Universal Parity Quantum Computing, Nov. 2, 2022, American Physical Society, Physical Review Letters, 18, DOI={ 10.1103/physrevlett.129.180503}, (Year: 2022).*

* cited by examiner

*Primary Examiner* — Daniel F. McMahon
(74) *Attorney, Agent, or Firm* — Workman Nydegger (57) ABSTRACT

This application concerns methods and apparatus for performing a quantum algorithm of logical qubits. The quantum algorithm is performed on a quantum system of physical qubits. The method includes providing a quantum system comprising a plurality of physical qubits in a spatial arrangement. The number of physical qubits is larger than the number of logical qubits. The logical qubits are encoded into physical qubits. A physical qubit represents either the parity of two or more logical qubits or a single logical qubit. Constraint-fulfilling sets of physical qubits fulfil constraints and each constraint-fulfilling set comprises a number of physical qubits such that every logical qubit is represented by zero or an even number of physical qubits in that set. The method includes enabling quantum interactions between logical qubits by performing quantum interactions on physical qubits. Further, at least a portion of the physical qubits is measured to obtain a readout.

20 Claims, 5 Drawing Sheets

QUANTUM ALGORITHMS OF LOGICAL QUBITS IN A QUANTUM SYSTEM WITH PHYSICAL QUIBITS ALLOWING ERROR CORRECTION AND INCREASED INTERQUBIT-CONNECTIVITY

FIELD

Embodiments described herein relate to apparatuses and methods for executing a quantum algorithm, more specifically for increasing connectivity when executing a quantum algorithm of logical quantum bits (qubits) on a quantum system, more specifically a quantum system including a plurality of physical qubits, more specifically the logical qubits are encoded into the physical qubits, more specifically the encoding may be used to correct errors occurring on the physical qubits.

BACKGROUND

Designing quantum computers and quantum algorithms is a current grand challenge in science and engineering, motivated by the prospect of solving certain problems exponentially faster than any known classical algorithms. However, the fundamental rules of quantum mechanics that make this new paradigm possible also impose fundamental restrictions. In contrast to classical information, quantum information cannot be copied, which is known as the no-cloning theorem, but only propagated. Thus, quantum computers will not be able to follow the von Neumann architecture with separated memory and computational unit. As the quantum CPU serves as memory and computational unit at the same time, connectivity between any quantum bits on the chip is required. In current standard approaches to gate-based quantum computers, either these long-range interactions are implemented as physical interactions, which limits scalability, or quantum information is moved on the chip via SWAP sequences, which requires a large overhead in gates.

Recent achievements in quantum hardware development on various qubit platforms might soon allow for experimental realizations of well-known quantum algorithms for reasonable system sizes. Nevertheless, a fundamental challenge of state-of-the-art quantum devices remains the interqubit connectivity on quantum chips. This is especially pressing because a long-range and dense (ideally all-to-all) connectivity is a crucial ingredient for many key quantum algorithms, unless algorithm-specific preprocessing steps are performed. Although there exist several quantum routing techniques, this is in particular problematic for scalability of devices beyond the noisy intermediate scale quantum (NISQ) era.

Further, these quantum computation systems are highly complex and their hardware systems are challenging to implement perfectly. In many cases, quantum computation systems introduce error when executing quantum algorithms that are detrimental to obtaining accurate results of the quantum algorithm. Thus, there is a high need for reducing these errors when executing quantum algorithms on quantum systems.

SUMMARY OF THE INVENTION

According to an embodiment of the invention a method for executing a quantum algorithm of logical qubits on a quantum system is provided. The method comprises providing a quantum system comprising a plurality of physical qubits in a spatial arrangement, wherein the number of physical qubits is larger than the number of logical qubits. The method further comprises encoding the logical qubits into the physical qubits, wherein each encoded physical qubit represents either the parity of two or more logical qubits or a single logical qubit, wherein physical qubits in constraint-fulfilling sets fulfil constraints, wherein each constraint-fulfilling set comprises a number of physical qubits such that every logical qubit is represented by zero or an even number of physical qubits in that set, wherein the physical qubits in a constraint-fulfilling set are preferably arranged in close physical proximity in the spatial arrangement. The method includes performing quantum interactions between logical qubits by performing quantum operations on physical qubits. Further, the method includes measuring at least a portion of the physical qubits to obtain a readout.

The inventive encoding of the logical qubits into the physical qubits via encoding the parity of the logical qubits allows to increase the logical interqubit connectivity. Thus, any quantum algorithm can be implemented via operations on the physical qubits without the need of SWAP gates and with the possibility of a parallelization of quantum gates. Further, there is a high flexibility in the encoding, such that an algorithm dependent encoding of the physical qubits is possible, which allows to reduce resources and minimize errors. Further, the inventive encoding provides a redundant encoding of the information of the logical qubits. This redundancy allows on the one hand to perform quantum interactions between arbitrary logical qubits by applying the corresponding operations on the physical qubits. On the other hand the redundancy provides an intrinsic potential to detect and correct errors of the physical qubits.

According to another embodiment of the invention, an apparatus for performing a quantum algorithm of logical qubits is provided. The apparatus comprises a quantum system comprising a plurality of physical qubits in a spatial arrangement. It further comprises an quantum operations unit configured for performing quantum operations on physical qubits corresponding to quantum interactions on the logical qubits. The apparatus comprises a measurement device adapted for measuring at least a portion of the plurality of physical qubits. Further, the apparatus comprises a classical computing system connected to the measurement device and/or the quantum operations unit. The apparatus is configured for encoding the logical qubits into the physical qubits, such that each physical qubit represents either the parity of two or more logical qubits or a single logical qubit, wherein in the encoding constraint-fulfilling sets of physical qubits fulfil constraints, wherein each constraint-fulfilling set comprises a number of physical qubits such that every logical qubit is represented by zero or an even number of physical qubits in that set. The physical qubits in a constraint-fulfilling set are preferably arranged in close physical proximity in the spatial arrangement.

Further advantages, features, aspects and details that can be combined with embodiments described herein are evident from the dependent claims, the description and the drawings.

BRIEF DESCRIPTION OF THE DRAWINGS

A full and enabling disclosure to one of ordinary skill in the art is set forth more particularly in the remainder of the specification including reference to the accompanying drawings wherein.

DETAILED DESCRIPTION OF THE INVENTION

Reference will now be made in detail to the various exemplary embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Within the following description of the drawings, the same reference numbers refer to the same components. Generally, only the differences with respect to the individual embodiments are described. The structures shown in the drawings are not necessarily depicted true to scale, and may contain details drawn in an exaggerated way to allow for a better understanding of the embodiments.

According to an embodiment of the invention a method for executing a quantum algorithm of logical qubits on a quantum system of physical qubits is provided. The physical qubits are the constituents of the quantum system. The physical qubits may be arranged in a spatial arrangement such that quantum interaction can be enabled between physical qubits which are in close physical proximity in this spatial arrangement. For example, the physical qubits may be arranged according to a square lattice. In this square lattice a physical qubit may occupy a vertex. In one physical implementation interactions are possible between qubits on neighbouring vertices. In other physical implementations interactions may be possible also between next-nearest neighbours, that is, e.g., along the vertices lying on diagonals of the square lattice. In a more general picture, the qubits may be arranged according to a mesh. This mesh may be a two-dimensional mesh. The vertices of the mesh represent possible sites for the physical qubits. In a mesh a cell may indicate that quantum interactions are possible between physical qubits arranged in that cell. The cell may be two-dimensional.

The number of physical qubits is larger than the number of logical qubits, e.g., n logical qubits may be encoded into K>n physical qubits. That is, the logical qubits are encoded into a larger number of physical qubits. Each physical qubit represents either the parity of two or more logical qubits or a single logical qubit. For instance, if the physical qubits are initialized in the z-basis, that is the basis states of a single qubit are $|0\rangle$ and $|1\rangle$, then an physical qubit fulfils $\tilde{\sigma}_z^{(i)}\tilde{\sigma}_z^{(j)}|\Psi\rangle = \sigma_z^{(ij)}|\Psi\rangle$ if it represents the parity of two logical qubits or it fulfils $\tilde{\sigma}_z^{(i)}|\Psi\rangle = \sigma_z^{(i)}|\Psi\rangle$ if it represents a single logical qubit. The operators $\tilde{\sigma}_z$ correspond to the logical qubits, and the operators $\sigma_z$ correspond to physical qubits and the state $|\Psi\rangle$ corresponds to a state in the code space. In the following operators denoted with a tilde correspond to logical qubits and operators without a tilde correspond to physical qubits, if not denoted otherwise. The superscripts correspond to qubit labels, that is the physical qubit would be labelled by ij and represents the parity of logical qubit i and logical qubit j. If the physical qubit represents the parity of more than two logical qubits in the equation above, simply more $\tilde{\sigma}_z^{(k)}$ for k≠i, j are added for all logical qubits whose parity shall be encoded and the physical qubit is labelled with all of the logical qubits whose parity it represents.

The physical qubits are certainly not restricted to any basis and may represent the parity of two or more logical qubits or a single logical qubit in any other basis in an analogue way as in the above shown example of physical qubits initialized in the z-basis.

In the encoding constraint-fulfilling sets of physical qubits fulfil constraints. Each constraint-fulfilling set comprises zero or an even number of physical qubits representing the same logical qubit either via the parity it has with other logical qubits or via directly corresponding to it. In other words, each constraint-fulfilling set comprises a number of physical qubits such that every logical qubit is represented by zero or an even number of physical qubits in that set. Without being bound to any particular theory the following is provided as an explanation of the significance of the constraint-fulfilling sets for the quantum algorithm to be performed on the quantum system.

Considering the above example these constraints may be of the form $\sigma_z^{(l1)}\sigma_z^{(l2)}\sigma_z^{(l3)}\sigma_z^{(l4)}|\Psi\rangle = |\Psi\rangle$, where the labels li contain the logical qubits which are encoded by the corresponding physical qubit. In this example the constraint-fulfilling set includes four physical qubits, each of them representing the parity of at least two logical qubits or representing a single logical qubit. So, if the physical qubit corresponding to index l1 represents the parity of logical qubits 1, 3 and 5, l1=135 and the physical qubit can be referred to as qubit 135. The numbers 135 are also called logical indexes. Thus, in every constraint-fulfilling set each logical index, e.g., 1, occurs zero or an even number of times. For example, a constraint-fulfilling set may comprise physical qubits 12, 23 and 31 representing the parity of pairs of logical qubits 1 to 3. If these physical qubits would not fulfil the constraint, e.g., in the z-basis given by $\sigma_z^{(12)}\sigma_z^{(23)}\sigma_z^{(31)}|\Psi\rangle = |\Psi\rangle$, then the physical qubits would not correspond to a logical state. In other words, the parity of logical qubits 1 and 2, and of logical qubits 2 and 3 determine the parity of logical qubits 3 and 1, which is reflected in the constraint. Thus, the inventive encoding ensures that physical qubits in constraint-fulfilling sets fulfil the constraints.

In a preferred embodiment the physical qubits in a constraint-fulfilling set are arranged in close physical proximity in the spatial arrangement. In the above-mentioned example of physical qubits arranged on a square lattice, these constraint-fulfilling sets may be formed by physical qubits arranged on neighbouring vertices.

The constraint-fulfilling sets can form cells, but they can also be formed by a line of preferably neighbouring qubits.

In order to enable quantum interaction between logical qubits and thus execute a quantum algorithm on the state of the logical qubits, physical quantum operations or interactions are applied on the physical qubits. Preferably, the physical interactions are applied on physical qubits which are in close physical vicinity to each other. As mentioned above, the inventive encoding allows to encode the logical qubits such that interactions on logical qubits correspond to operations on physical qubits which are in close physical vicinity.

In many quantum algorithms long-range interactions between qubits are necessary. The inventive encoding of the parity of logical qubits onto the physical qubits allows to implement these effectively long-range interactions on the logical qubits as short-range interactions on the physical qubits. Further, the spatial arrangement of the physical qubits can be varied in the encoding, such that tailored encodings of the physical qubits for particular algorithms can be constructed. In order to find these tailored encodings, e.g., a quantum operation control unit as described in WO 2022/008057 A1 can be used. The document WO 2022/008057 A1 is incorporated by reference.

A Universal Gate Set

In a certain embodiment the quantum operations are operations out of a universal gate set. This universal gate set may include gates corresponding to rotation operator gates and controlled phase gates. This is one example of a universal gate set, however, the embodiments of the invention are not restricted to this example. The rotation operator gates are single-body unitary operators, are operators acting on a single qubit of the quantum system, e.g., the i-th qubit. Mathematically, a single-body unitary operator has the form $U = U' \otimes I$, wherein U' is a unitary operator acting on a single qubit, and I is the identity operator acting on all qubits except for the single qubit. The rotation operator gates allow for a rotation of the single qubit they are acting on around the x-, y-, or z-axis of the Bloch sphere about an angle $\alpha$. Controlled phase gates are two-body operators. A controlled phase gate acts as follows on a set of basis vectors for two qubits: $|00\rangle$ is mapped to $|00\rangle$; $|01\rangle$ is mapped to $|01\rangle$; $|10\rangle$ is mapped to $|10\rangle$; and $|11\rangle$ is mapped to $e^{i\varphi}|11\rangle$.

Any single qubit operation on logical qubits can be constructed via logical rotation operator gates, e.g. any single qubit operation on a logical qubit (i) can be written in the form $$U = \tilde{R}_z(\alpha)\tilde{R}_x(\beta)\tilde{R}_z(\gamma),$$

with $\tilde{R}_z(\alpha) = \exp\left(-i\frac{\alpha}{2}\sigma_z^{(i)}\right)$ and $\tilde{R}_x(\beta) = \exp\left(-i\frac{\alpha\beta}{2}\sigma_x^{(i)}\right)$.

Figure 6:
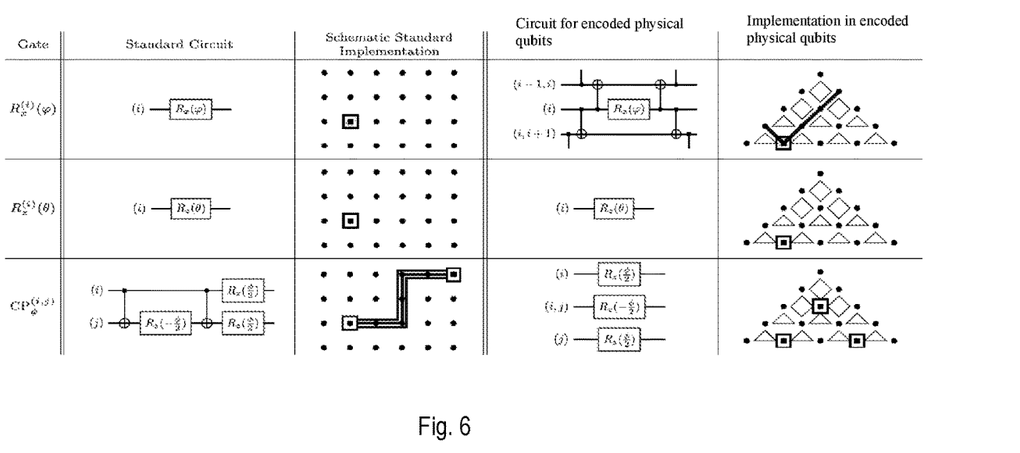
FIG. 6 shows a comparison of the implementation of a universal gate set in a standard implementation and in an implementation with logical qubits encoded into physical qubits according to the invention.

As shown in FIG. 6 these single qubit rotation operator gates can be implemented in the physical qubits in the following way. A rotation around the z-axis of a logical qubit (i) corresponds to a rotation around the z-axis of the corresponding physical qubit, which corresponds to the logical qubit, e.g., $$\tilde{R}_z^{(i)}(\alpha) = \exp\left(-i\frac{\alpha}{2}\sigma_z^{(i)}\right) = R_z^{(i)}(\alpha).$$

Due to the inventive encoding, thus, z-rotations can be easily implemented. A rotation around the x-axis of a logical qubit (i) can be implemented via a chain of controlled NOT (CNOT) gates on pairs of physical qubits which represent the parity of two logical qubits, i.e., the logical qubit (i) and another logical qubit (j≠i), and a rotation around the x-axis of the physical qubit corresponding to logical qubit (i), see FIG. 6. A CNOT gate acts as follows on a set of basis vectors for two qubits: $|00\rangle$ is mapped to $|00\rangle$; $|01\rangle$ is mapped to $|01\rangle$; $|10\rangle$ is mapped to $|11\rangle$; and $|11\rangle$ is mapped to $|10\rangle$. Therein, the first qubit is the control qubit of the CNOT gate, and the second qubit is the target qubit of the CNOT gate, which gets bit-flipped if the control qubit is in state $|1\rangle$. On the right column in FIG. 6 the physical qubits are arranged in a two-dimensional square lattice, which is an exemplary spatial arrangement for encoding the logical qubits into the physical qubits. The physical qubits lie at positions of vertices of the two-dimensional square lattice that form a triangle portion of the two-dimensional square lattice. The squares and triangles connecting physical qubits correspond to constraint-fulfilling sets.

As also depicted in FIG. 6, a controlled phase gate, which is necessary to obtain a universal gate set for which in addition to the rotation operator gates an additional two-qubit entangling gate is necessary, can be easily implemented on the physical qubits via local operations. For example, for implementing the controlled phase gate on logical qubits (i) and (j) simply a local rotation around the z-axis of three physical qubits has to be carried out, namely on the two physical qubits representing the logical qubits (i) and (j) and on the physical qubit ij representing the parity of the two logical qubits (i) and (j).

Thus, via this example of a universal gate set arbitrary quantum circuits can be build and hence, any quantum algorithm can be executed via the physical qubits. In order to obtain a result at least a portion of the physical qubits is measured in the end to obtain a readout. Depending on the algorithm that is executed, different qubits may be measured for the readout. As the logical qubit state is encoded in a redundant matter in the physical qubits, in general a variety of possible groups of qubits can be measured to provide a readout.

Encoding

Figure 1:
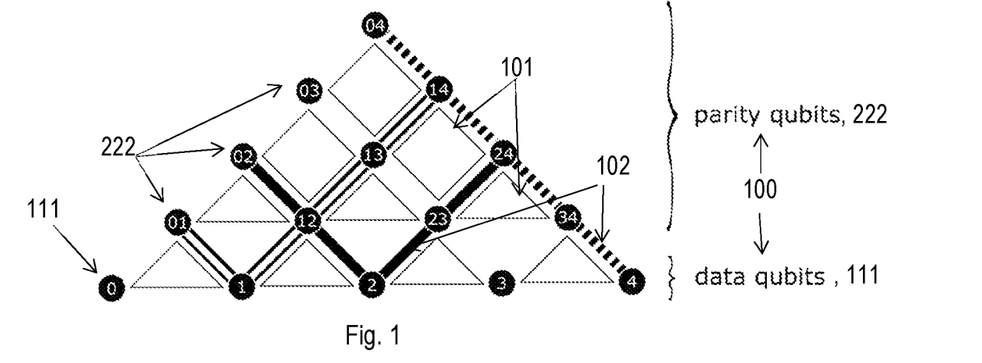
FIG. 1 shows an exemplary encoding with physical qubits arranged in a two-dimensional lattice comprising data and parity qubits.

As depicted in FIG. 1 in a certain embodiment of the present invention the physical qubits 100 comprise data qubits 111 and/or parity qubits 222, wherein the number of data qubits 111 is the same as or smaller than the number of logical qubits, wherein the data qubits 111 represent single logical qubits, wherein the parity qubits 222 represent the parity of at least two logical qubits. In FIG. 1 the physical qubits 100 comprise five data qubits 111 labelled by their corresponding logical indices 0 to 5. Further, the physical qubits 100 comprise ten parity qubits 222 representing the parity of two logical qubits labelled by indexes i j, with i≠j∈ {0, . . . , 4}. For example, the parity qubit 222 labelled with 04 represents the parity of logical qubits 0 and 4. If the state of the logical qubits comprises 5 qubits the encoding in FIG. 1 is an example of an encoding with physical qubits 100 comprising data qubits 111 directly corresponding to the logical qubits and comprising all parity qubits 222 which represent the parity of two logical qubits, that is, there is a parity qubit 222 for every combination of two logical qubits.

Thus, in this example n logical qubits are encoded into n(n+1)/2 physical qubits 100, e.g., five logical qubits are encoded into fifteen physical qubits 100. In other words, n all-to-all connected logical qubits can be represented by n(n+1)/2 physical qubits 100, as depicted in FIG. 1. Further, for the all-to-all connectivity the physical qubits 100 fulfil n(n+1)/2−n constraints, e.g., in the encoding of FIG. 1 this would correspond to ten constraints. In FIG. 1 these constraint-fulfilling sets 101 are highlighted by triangles and squares between the corresponding physical qubits 100. The triangles correspond to three-body constraints between three physical qubits 100 at the corners of the triangles and the squares similarly correspond to four-body constraints between four physical qubits 100. Note, however, that the constraint-fulfilling sets 101 do not have to correspond to cells. In a different embodiment the physical qubits 100 can be arranged in another spatial arrangement, such that the qubits of a constraint-fulfilling set 101 may be e.g., arranged on a line. In FIG. 1, three lines 102 are drawn, each connecting five physical qubits 100, one drawn as a double line, one drawn as a thick line, and one drawn as a dashed line. These lines are also referred to as logical lines 102 and connect physical qubits 100 sharing the same logical index i. In FIG. 1 the double line corresponds to physical qubits 100 sharing the index 1, that is, physical qubits 100 either representing logical qubit 1 (data qubit 111, 1) or representing the parity of logical qubit 1 with another logical qubit (parity qubits 222). As explained above, the rotation operator which rotates a single qubit around the x-axis can be implemented in the physical qubits 100 via chains of CNOT gates along a logical line 102.

In a preferred embodiment the encoding process encodes the parity of a set of n physical qubits onto a new physical qubit. This process is uniquely defined by its action on the computational basis states. For example, if the n physical qubits are initially in the state $|l1\rangle |l2\rangle \ldots |ln\rangle$ with $li \in \{0, 1\}$, then the encoding adds a new physical qubit (which was previously separable from the physical qubits in the encoding) and puts the combined system in the state $|l1\rangle |l2\rangle \ldots |ln\rangle |l1 \otimes l2 \otimes \ldots \otimes ln\rangle$, where $\otimes$ denotes addition modulo two and the last state vector here describes the state of the new physical qubit in the encoding. Note that if the physical qubits in the encoding are entangled, e.g., the state of the logical qubits is entangled, the combined system is given by a superposition of basis states as described above. The physical qubits used in the encoding can already be parity qubits 222 themselves, representing the parity of multiple logical qubits. The new physical qubit thus represents the parity of those parity qubits 222, which can always be represented as the parity of the logical qubits directly. For example, a new physical qubit, which is encoded out of the parity qubits 12 and 23, represents the parity 13.

With every encoding process, also a constraint can be associated. This constraint requires that the new physical qubit holds the parity of the other physical qubits used in the encoding. For the example above, this would mean that parity qubits 12, 23 and 13 fulfil a constraint and form a constraint-fulfilling set 101. As depicted in FIG. 1, this constrain-fulfilling set 101 may correspond to the triangle connecting parity qubits 12, 23 and 13. Thus, the encoding process ensures that the constraints are fulfilled by physical qubits in constraint-fulfilling sets 101.

This encoding scheme allows also for a very simple decoding scheme of physical qubits. Thus, in another embodiment of the invention, the physical qubits are decoded. For the implementation of quantum algorithms, it may be useful or necessary to decode physical qubits, e.g., representing logical ancilla qubits. Decoding is given by the reverse encoding process. In the decoded state, the removed physical qubit is always disentangled from all other physical qubits. An important advantage of this encoding and decoding is that the amount of parity qubits can be changed by de- or encoding, which adds or removes a new parity qubit to the physical qubits.

Preferably, in the encoding in a first step the data qubits are initialized in the quantum state of the logical qubits, wherein in further steps additional physical qubits are initialized and a new parity qubit is added to the encoding by encoding the parity of some of the physical qubits onto the new parity qubit, which form a constraint-fulfilling set with the new parity qubit. Further, it is also possible to initialize further data qubits in the encoding scheme after the addition of parity qubits to the encoding.

Figure 2:
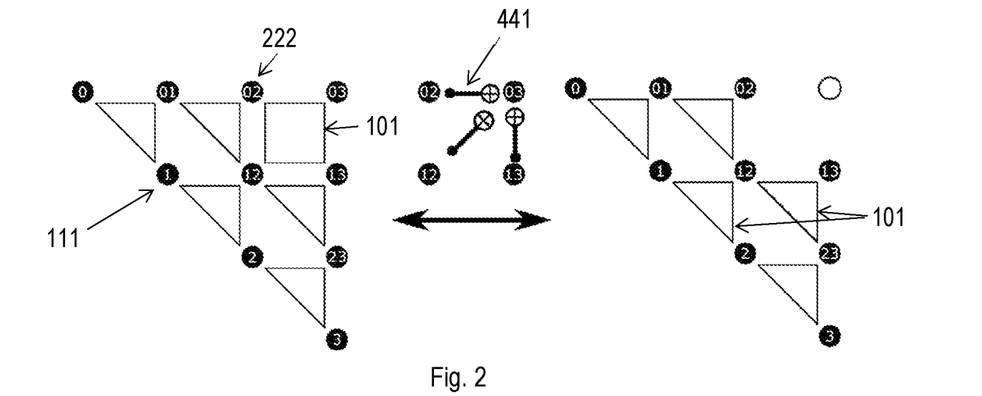
FIG. 2 shows an encoding and decoding procedure for physical qubits using controlled NOT gates, which may be used in embodiments described herein.

A possible way to perform the encoding is to initialize the new physical qubit in the state $|0\rangle$ and act with a physical CNOT gate 441 on it from each of the existing physical qubits of which the new physical qubit shall represent the parity (see FIG. 2), that is, from each of the physical qubits which form a constraint-fulfilling set 101 with the new parity qubit 222. The CNOT gates 441 force the new physical qubit to have the right parity, as the new physical qubit is bit-flipped for every control qubit corresponding to the other physical qubits in the same cell as the new physical qubit, which is in the state $|1\rangle$. Decoding is the reverse process and can thus be done with the reversed gate sequence. In the example in FIG. 2, physical qubit 03, that is a parity qubit 222, gets encoded or decoded, by applying CNOT gates 441 on this new physical qubit representing the parity of logical qubits 0 and 3 and the physical qubits 02, 12, 13. Thus, the physical qubits 02, 12, 13 and 03 form a constraint-fulfilling set 101, depicted by the square in FIG. 2. After decoding, former physical qubit 03 is decoupled from all physical qubits and depicted by the white circle in FIG. 2.

In order to decode a larger set of physical qubits, the order in which they are decoded might be important: A physical qubit which has been removed from the encoding cannot be used later on to decode other physical qubits. For example, if the parity qubit 01 is decoded, and then also parity qubit 02 shall be decoded, parity qubits 01 and 12 cannot be used anymore, as 01 is already decoded. Thus, other physical qubits which might be further away in the spatial arrangement, e.g., according to a mesh, as for example the data qubits 0 and 2 have to be used. However, if parity qubit 02 is decoded first, then the adjacent parity qubits 01 and 12 can be used for the decoding. Afterwards parity qubit 01 can be decoded by using the adjacent data qubits 0 and 1.

Figure 3:
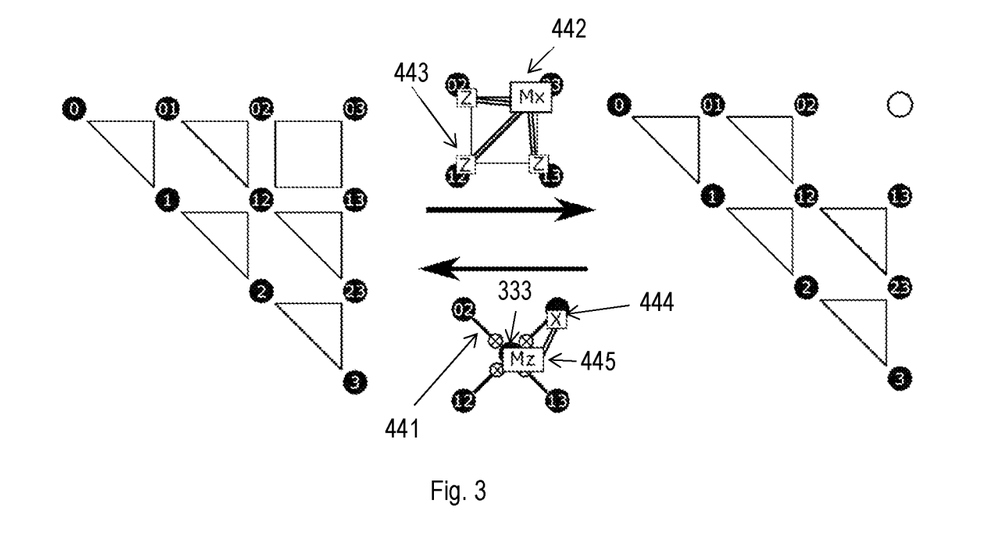
FIG. 3 shows an encoding and decoding procedure for physical qubits using ancilla qubits, measurements and corrections depending on the measurement results, which may be used in embodiments described herein.

In a different embodiment in the encoding each new parity qubit 222 is initialized in the state $|+\rangle$, and a constraint measurement 445 is applied on an ancilla qubit 333, which is initialized in state $|0\rangle$ and onto which controlled NOT gates 441 are applied from each of the physical qubits which form a constraint-fulfilling set 101 with the new parity qubit 222. Depending on the outcome of the constraint measurement 445, a bit-flip operation 444 is applied on the new parity qubit 222 or not. This decoding and encoding scheme is depicted in FIG. 3 for a simple example. This embodiment is an alternative way to add physical qubits to the encoding via a measurement-based strategy, which is beneficial if a large number of physical qubits shall be encoded or decoded at once. In this embodiment measurements and classical corrections depending on the measurement outcomes are used. Each new physical qubit 100, which shall be added to the encoding, is initialized in the state $|+\rangle$. Then a constraint can be chosen, which fixes the new qubit relative to physical qubits, e.g., parity or data qubits 222, 111, which after encoding form a constrained-fulfilling set 101 with the new parity qubit 222. If the physical qubits are arranged according to a mesh, the physical qubits may be arranged in the same cell as the new physical qubit. The constraint value is measured with the help of an ancilla qubit 333, which is initialized in the state |0⟩ and correlated with the physical qubits and the new physical qubit in the constrained-fulfilling set 101. This correlation can be achieved by applying CNOT gates 441 on. the ancilla qubit 101 from each of the physical qubits in the constraint, where the physical qubits act as the control qubits for the CNOT gate 441. For every new parity qubit 222, it is always possible to define such a new constraint and thus, obtain anew constraint-fulfilling set 101 associated with them. For example, it can be the operator $\sigma_z^{(I1)}\sigma_z^{(I2)}\sigma_z^{(I3)}\sigma_z^{(I4)}$, which connects the new parity qubit 222 to the adjacent physical qubits in a cell of e.g. a two dimensional, quadrangular mesh. In more general encodings, the constraints can always be constructed from the new physical qubit together with a set of physical qubits whose parity the new physical qubit shall define, that is, the physical qubits, which after encoding correspond to a constraint-fulfilling set 101. If the constraint measurement 445 on the ancilla qubit 333 indicates a violation of the constraint, a bit-flip (X) operation 444 has to be performed on the new physical qubit. In case no violation is indicated by the measurement, no operation is applied on the new physical qubit.

In the example of FIG. 3 again physical qubit 03 shall be encoded by applying CNOT gates 441 on an ancilla qubit 333 and physical qubits 02, 12, 13. Afterwards, the coupled ancilla qubit 333 is measured in the z-basis 445 and depending on the outcome, a bit-flip 444 is applied on the new parity qubit 03 or not, such that the constraint $\sigma_z^{(02)}\sigma_z^{(12)}\sigma_z^{(13)}\sigma_z^{(04)}|\Psi\rangle = |\Psi\rangle$ is fulfilled.

For decoding, the constraints are not needed anymore, as they are fulfilled for the physical qubits. Thus, the physical qubit which shall be decoded is measured directly in the X basis 442, and a phase-flip (Z) operation 443 is applied on a set of physical qubits whose parity the decoded physical qubit described, that is the set of physical qubits in the constrained-fulfilling set 101 of the physical qubit, that shall be decoded. This can be understood as the classical analogue of the CNOT gate sequence in the embodiment described above.

This measurement-based strategy can be performed in constant depth, also for encoding and decoding multiple physical qubits which might depend on each other. An advantage of the measurement-based strategy is that one can apply all gates and measurements in parallel. Then the corrections necessary after the measurement may depend on multiple measurement outcomes. Every constraint measurement which contains more than one new physical qubit also depends on whether some of these new physical qubits should have been flipped by other constraint measurements. As in the constant-depth implementation this flip would only occur after all the constraint measurements, the outcome of every measurement needs to be reinterpreted taking into account all corrective flips. For this, one can define the set S as the set of physical qubits for which the necessary corrections have been determined. Initially, S contains all physical qubits which are not subject to any corrections. In the encoding process, this is exactly the physical qubits which are already part of the encoding. In the decoding process, this includes some of the physical qubits to be decoded (those on which no other physical qubits depend via the decoding constraints) and can further include physical qubits which remain encoded (those which are not in any of the decoding constraints). The following steps may be applied until all physical qubits are in S:
1. Determine the corrections to all physical qubits whose correction depends only on measurement results of physical qubits in S, taking into account their determined corrections.
2. Update S (add the physical qubits determined in step 1 to S).

Error Correction

The method according to embodiments described herein includes performing error correction on the physical qubits. Further, the apparatus according to embodiments described herein includes a quantum operations unit, a measurement device and a classical computing system, which are adapted to execute the error correction. The error correction may be done by detecting errors via constraint measurements, that is, measurement of the parity of the physical qubits in a constraint-fulfilling set and depending on the outcomes of the constraint measurement applying local operations on the physical qubits, for which errors were detected.

In the apparatus and the method according to the invention the redundant encoding of the logical qubits into the physical qubits allows to detect and correct errors occurring on the physical qubits. As the constraints, where each constraint is fulfilled by physical qubits in a constrained-fulfilling set, commute with any logical operator, measuring their value does not disturb the logical state of the system. Thus, constraint measurements can be used for error correction. The constraint measurements necessary for detecting errors can be for example implemented with the help of ancilla qubits. For a constraint measurement, the ancilla qubit is first coupled to all physical qubits in the constrained-fulfilling set, e.g., by applying CNOT gates on the ancilla qubit from all constraint fulfilling physical qubits. After coupling the ancilla qubit is measured, to obtain a readout. With the help of the measurement, it can be revealed if the constraint is fulfilled or not by the physical qubits in the constrained-fulfilling set, with which the ancilla qubit was coupled. This is one exemplary embodiment for the constraint measurements, however, these measurements can be accomplished in many other ways.

In an exemplary embodiment the physical qubits may be arranged according to a mesh, that is, the physical qubits are arranged on vertices of the mesh and the constraint-fulfilling sets may correspond to cells of the mesh. In such an embodiment the ancilla qubits can be for example arranged in the middle of the cell whose vertices contain the physical qubits that correspond to a constraint-fulfilling set. The physical qubits of the constraint-fulfilling set may be arranged according to all vertices or some of the vertices of a cell of the mesh. The ancilla qubit then can be coupled to all physical qubits in a cell fulfilling a constraint. In a certain embodiment this coupling can be done by applying CNOT gates to the ancilla qubit from each of the physical qubits in the constraint-fulfilling set, wherein the physical qubits act as the control qubits. Afterwards the ancilla qubit can be measured in the Z basis. The measurement result indicates if the constraint is still fulfilled by the physical qubits or if an error, namely a bit-flip error has occurred.

In order to find out on which physical qubits errors occurred, several constraint measurements are applied. Preferably, the same constraint measurement on a group of physical qubits is applied several times, in order to be resistant to measurement errors. After doing all constraint measurements, a decoding algorithm can be used, which determines the most probable error scenario out of the measured data. The decoding algorithm may be implemented with the help of a classical computing system. The measured data includes for all constraint measurements the information if the constraint is fulfilled or not. The most probable error scenario indicates on which physical qubits and at which times an error has occurred. There exist a lot of different decoding algorithms that can be used for determining the error scenario, an example is belief propagation.

Figure 4:
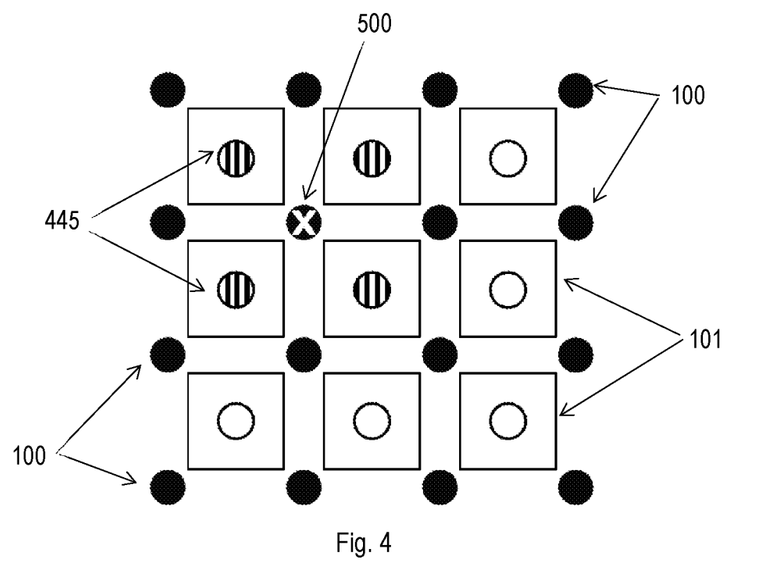
FIGS. 4 and 5 show an implementation of error correction on the physical qubits using ancilla qubits and measurements on these ancilla qubits, which may be used in embodiments described herein.
Figure 5:
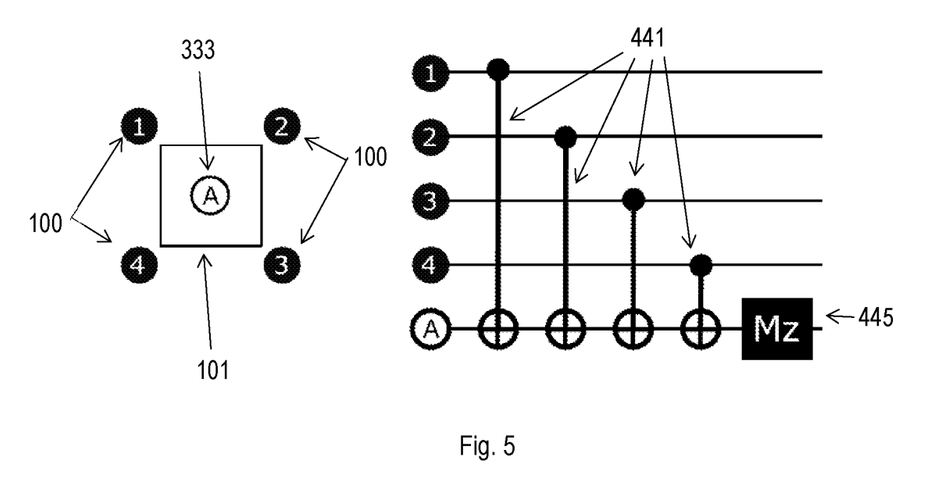

In FIG. 4, an illustrative example is shown, in which it can be seen how it is possible to detect on which physical qubit 100 a single error 500 occurred out of the results of the constraint measurements 445. In this example, the constraints were measured only one time and the measurement results are assumed to be correct and/or trustworthy. Further, the physical qubits 100 are arranged on vertices of a two-dimensional square lattice and constraint-fulfilling sets 101 of physical qubits 100 are marked with squares connecting four physical qubits 100. In this example an error 500, e.g., a bit-flip error, occurred on the physical qubit 100 which is marked with a white cross. Due to this error 500, four constraints 101 are no longer fulfilled, which can be detected by constraint measurements 445, e.g., on ancilla qubits 333 which were coupled to the corresponding physical qubits 100. An example for a constrained measurement 445 via ancillas 333 is shown in FIG. 5, where the ancilla qubit 333 is arranged in the middle of a constraint-fulfilling set 101 and is coupled to all physical qubits 100 in the constraint-fulfilling set 101 by applying CNOT gates 441 on the ancilla qubit 333 from each of the physical qubits 100 in the constraint-fulfilling set 101. After this coupling the ancilla qubit 333 can be measured in the z-basis 445, to see if the constraint is fulfilled by the physical qubits 100. These constraint measurements 445 indicate for the example of FIG. 4 that the most probable error scenario is the one in which an error 500 occurred on the marked physical qubit. All other error scenarios which would result in the same constraint measurement results are much more unlikely to occur, as for these scenarios a lot of physical qubits 100 would have been flipped simultaneously. With a small enough average error rate on the physical qubits 100, this is very unlikely to occur. The information about the most likely error scenario can be obtained with the help of a classical decoding algorithm. The flipped physical qubit can be corrected by applying a local bit-flip operation onto it.

In another embodiment according to the invention the physical qubits are noise-biased qubits. With the help of the constraint measurements one type of errors, e.g., bit-flip errors, can be detected. Thus, the inventive encoding of the physical qubits allows for the correction of one type of error. In order to ideally complement this the physical qubits may be noise-biased qubits which are intrinsically robust against the other type of error, e.g., phase-flip errors. Such noise-biased qubits are for example cat qubits or asymmetric GKP qubits in resonators. These noise-biased qubits have the ability to suppress one type of noise at the cost of an increased rate for the other type of noise. As the redundant encoding of the physical qubits according to the invention allows for a correction of the other type of noise, all types of errors are small in the end.

Apparatus and Quantum System

An embodiment of the invention includes an apparatus for performing a quantum algorithm of logical qubits. That is, on this apparatus the method according to the invention can be conducted.

This apparatus and the method according to the invention comprise a quantum system with a plurality of physical qubits in a spatial arrangement. The quantum system can be for example a superconducting circuit, a system of one or multiple ion traps, a system of neutral atoms, a system of photons, a spin system, etc. The apparatus may include a universal quantum computer and a classical computing system, in order to allow executing any quantum algorithm with the help of the apparatus. In a certain embodiment, the constituents of the quantum system, that is the qubits, may be in a certain spatial arrangement in which quantum interactions are only possible between nearest-neighbours and/or between next-nearest-neighbours. Due to the inventive encoding of the logical qubits this is not a restriction for the inventive method and apparatus, as interactions between logical qubits can be implemented by neighbouring physical qubits. It is important to highlight, however, that the method and the apparatus are independent of the specific quantum system. Thus, any available quantum system comprising qubits can be used. Note also that a quantum system comprising qudits, that is d-level systems, can of course also be used, as it is always possible to address only two levels of these d-level systems. Further, the physical qubits can be noise-biased qubits to minimize occurring errors while performing the quantum algorithm, as explained above. In another embodiment the physical qubits are arranged on a chip. For example, the physical qubits can be arranged according to a two-dimensional square lattice on the chip.

The apparatus includes a quantum operations unit configured for performing quantum operations on physical qubits corresponding to quantum interactions on the logical qubits. Further, the apparatus includes a measurement device adapted for measuring at least a portion of the plurality of physical qubits and a classical computing system connected to the measurement device and/or the quantum operations unit. With the help of these units and systems the apparatus is configured for encoding the logical qubits into the physical qubits such that each physical qubit represents either the parity of two or more logical qubits or a single logical qubit, wherein in the encoding constraint-fulfilling sets of physical qubits fulfil constraints, wherein each constraint-fulfilling set comprises a number of physical qubits such that every logical qubit is represented by zero or an even number of physical qubits in that set, wherein the physical qubits in a constraint-fulfilling set are preferably arranged in close physical proximity in the spatial arrangement. Thus, the apparatus allows for the inventive encoding. As described above, there are several possibilities to encode the parity of the logical qubits onto the physical qubits. Hence, the apparatus may be adapted according to the used method for encoding the physical qubits. In certain embodiments only the quantum operations unit may be used for encoding the logical qubits into the physical qubits, whereas in other embodiments also the measurement device and the classical computing system may be used for the encoding. The classical computing system can be connected to both the measurement device and the quantum operations unit and for example, allow to implement quantum operations on the physical qubits depending on the outcome of measurements executed by the measurement device. The classical computing system may also comprise a controller, which is configured to control the measurement device and/or the quantum operations unit.

The quantum operations unit allows to implement a quantum algorithm by performing interactions between the physical qubits. The physical qubits in a constrained-fulfilling set may be in close physical proximity, e.g., they can be arranged in a cell of a mesh, according to which the physical qubits of the quantum system are arranged. In the encoding physical qubits may be arranged spatially such that those physical qubits, onto which quantum interaction shall be applied, are in close physical proximity. Hence, the arrangement of the physical qubits in the encoding can be adapted to the algorithm that shall be implemented via the quantum system. Thus, the inventive encoding prevents the need for long-range interactions, which would require, e.g., the implementation of SWAP gates, which are very prone to errors and require a large overhead in gates, especially quantum interactions. Hence, the inventive method and apparatus can be implemented on various current noisy intermediate scale quantum (NISQ) devices due to their increased logical interqubit connectivity. Further, the measurement device of the apparatus is a standard measurement device which, depending on the kind of quantum system used, allows one to measure qubits to obtain a readout. Measuring physical qubits, e.g., ancilla qubits, may also be necessary during encoding or error correction.

The apparatus also includes a classical computing system connected to the measurement device and/or the quantum operations unit. The classical computing system allows, e.g., for a processing of the measurement results. A classical computing system may refer to a computing system operating on bits or other classical units of information. A classical computing system may include a central processing unit (CPU) for processing information represented by bits and/or a memory for storing information represented by bits. A classical computing system may include one or more conventional computers, such as personal computers (PCs), and/or a network of conventional computers.

In another embodiment of the invention the apparatus is also adapted to detect and correct errors, wherein the measurement device is adapted to perform constraint measurements on physical qubits in a constraint-fulfilling set to obtain error syndromes, wherein the classical computing system is adapted to receive and decode the measured error syndromes and determine the actual errors to correct, wherein the quantum operations unit is adapted to apply operations on a subset of the physical qubits according to the decoded error syndromes. The constraint measurement can be implemented as described above.

Further, the apparatus may also comprise an initialization unit, which is configured for initializing the physical qubits in a quantum state. For example, the initialization unit allows to initialize the data qubits in the quantum state of the logical qubits. Further, it may allow to initialize ancilla qubits for encoding or error correction in certain quantum states and parity qubits, which shall be added to the encoding, in certain quantum states, depending on the encoding method that is used. Note that for certain quantum system initialization might not be necessary if the qubits of the quantum system are able to self-initialize themselves.

In the following, an example of a quantum system comprising neutral atoms and its implementation for the method and apparatus according to the invention is described.

The following is just an example of a quantum system and the embodiments described herein are not limited to this example implementation.

For providing the neutral atoms (alkali or alkaline-earth species), for example Rubidium atoms (87Rb) can be positioned in a two-dimensional optical tweezer array.

The computational states of the qubits of this system can be two different hyperfine ground states, e.g., F=1 and F=2 (requires the presence of a magnetic field).

The physical qubits are initialized via optical pumping, thus the initialization unit is configured to perform optical pumping. For the readout with the measurement device a fluorescent image of the tweezer array or area of interest is taken, such that atoms in state |0> appear bright while atoms in state |1> remain dark.

The quantum operations unit allows for the implementation of single-qubit gates and multi-qubit gates. These gates may be implemented as described below.

Single-qubit gates: Single-qubit gates are realized via two simultaneous laser pulses, where the frequency is tuned such that the addressed atom interacts with the electromagnetic field of the laser, spatially focused at the position of the addressed atom.

Multi-qubit gates: A controlled-Z gate between two atoms can be performed by driving both atoms with a laser which couples the states through a highly excited Rydberg state (in the Rydberg blockade regime, where two adjacent atoms cannot be simultaneously excited to the Rydberg states due to strong dipole-dipole interaction). All other multi-qubit gates, for example controlled-NOT gates, can be derived from this gate by applying additional single-qubit gates. These gates can in principle be performed between any pair of qubits due to strong long-range dipole-dipole interaction, but the closer the qubits, the better the gate fidelity and/or the faster the implementation time (as the interaction has a power-law decaying behaviour in distance). Gates between nearest and next-nearest neighbors on a square lattice can be implemented with sufficient fidelity.

Applications and Examples of the Increased Connectivity in Known Quantum Algorithms The applicability of the above described universal gate set in combination with the inventive method and apparatus for increased interqubit connectivity in the described encoding of the logical qubits is shown in the following by exploring several quantum gate algorithms such as the quantum Fourier transform and quantum addition.

Embedding these algorithms in the encoding reduces the circuit depth compared to conventional gate-based implementations while keeping the multi-qubit gate counts comparable. Note that all algorithms mentioned are only examples of using the inventive encoding of logical qubits into physical qubits, which can be used with any other algorithm as well.

A universal gate set may be provided by an encoding involving all possible data qubits. The universal gate set may be based on the operators (see also above)

$$\tilde{R}_x^{(i)}(\alpha) = \exp\left(-i\frac{\alpha}{2}\sigma_x^{(i)}\prod_{j<i}\sigma_x^{(ji)}\prod_{j>i}\sigma_x^{(ij)}\right),$$

$$\tilde{R}_z^{(i)}(\alpha) = \exp\left(-i\frac{\alpha}{2}\sigma_z^{(i)}\right) = R_z^{(i)}(\alpha), \ C\tilde{P}_\phi^{(i,j)}(\alpha) = R_z^{(i)}\left(\frac{\phi}{2}\right)R_z^{(ij)}\left(-\frac{\phi}{2}\right)R_z^{(j)}\left(\frac{\phi}{2}\right).$$

Logical operators (with a tilde) act on the logical qubits defined in the constraint-fulfilling subspace and commute with all constraint operators. In contrast to that, physical operators (without a tilde) do not necessarily preserve the constraint-fulfilling subspace. The $\tilde{R}_x$ operators require chains of CNOT gates due to the product of Pauli operators in the exponent, while the other logical operators can be implemented with physical single-qubit operations only. This is also depicted in FIG. 6. The set of physical qubits that are involved in $\tilde{R}_x^{(i)}$, that is the set of all physical qubits containing the logical index i, is referred to as the logical line associated with qubit (i).

1. Arbitrary Single-Qubit Gates

Any single-qubit unitary U can be decomposed into rotations $U=\tilde{R}_z(\alpha)\tilde{R}_x(\beta)\tilde{R}_z(\gamma)$ with some angles $\alpha$, $\beta$ and $\gamma$.

Figure 7:
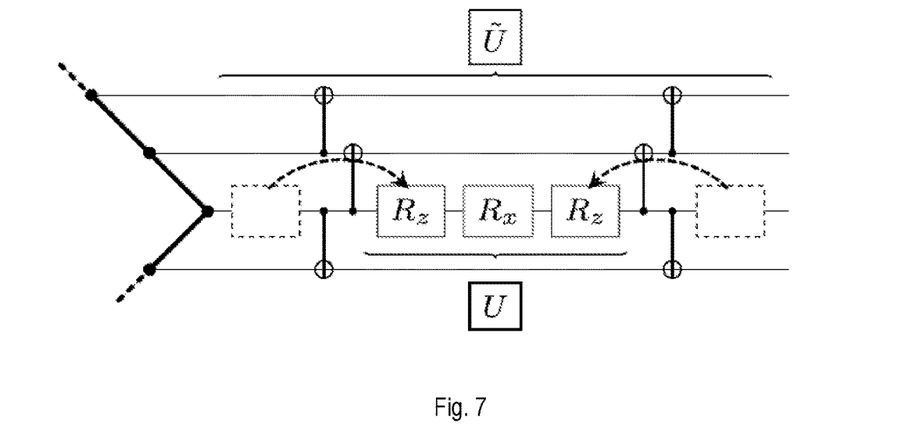
FIG. 7 shows a realization of a logical single-qubit unitary on physical qubits.

Any logical single-qubit gate can thus be easily constructed using the operators defined above. The two $\tilde{R}_z$ rotations can be easily implemented with physical rotations on the corresponding data qubits. The $\tilde{R}_x$ rotation requires a chain of controlled-NOT (CNOT) gates along the logical line and a physical $R_x$ rotation on one of its qubits. If the physical $R_x$ rotation is chosen to be performed on the respective data qubit, it can be recombined with the surrounding $R_z$ rotations to the unitary U, now acting on the physical qubit, as shown in FIG. 7. This is possible because the CNOT gates commute with $R_z$ gates acting on their control qubit. Hence, a single qubit unitary on a logical qubit (i) can be implemented by performing the gate on the data qubit (i) and applying CNOT gates along the corresponding logical line. Further, the single-qubit $R_x$ rotation can be performed on a physical qubit, i.e. a parity qubit, representing the parity of two logical qubits instead of the data qubit of the logical line. In that case, the decomposed rotations cannot be recombined, but for n>4, the additional $R_z$ rotations can be performed in parallel with the CNOT chains. In combination with a partial parallelization of CNOT chains, this leads to a minimal circuit depth for any single-qubit unitary of $$d_U = 2\left\lceil \frac{n}{2} \right\rceil + 1.$$

2. Two-Qubit Gates

While a logical $CP_\phi$ gate can be implemented in the encoding with only physical single-qubit gates according (see above), a logical CNOT gate requires two additional Hadamard gates on the target qubit and can be written in the decomposition $CNOT^{(c,t)} = H^{(t)} CZ^{(c,t)} H^{(c)}$. In this decomposition, logical Hadamard gates $H^{(t)}$ require $R_x$ gates and thus CNOT chains along the logical line.

3. Quantum Fourier Transform

Figure 11:
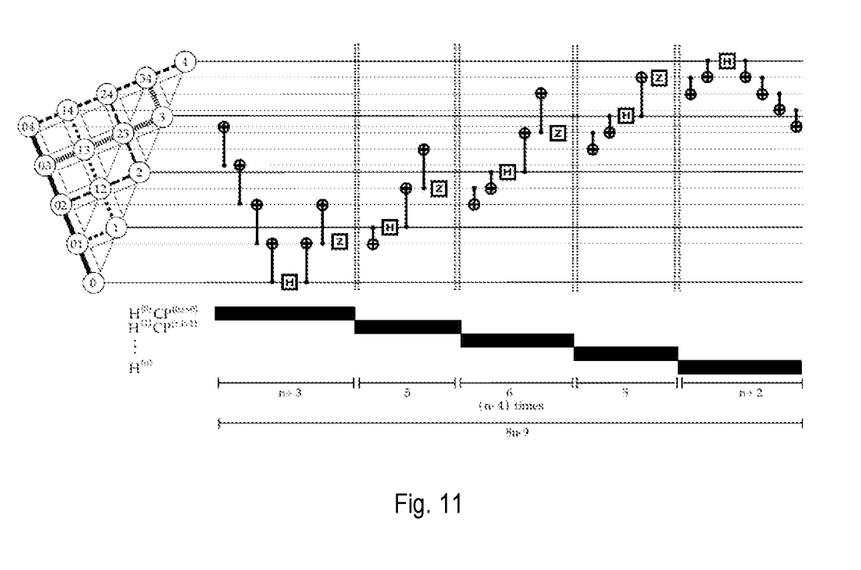
FIG. 11 shows gates of a circuit for performing Quantum Fourier Transformation on physical qubits, where only the gates which contribute to the total circuit depth, i.e., which cannot be parallelized any further, are shown and all other gates can be performed in parallel to the shown gates.

The quantum Fourier transform (QFT) is the quantum analogue to the discrete Fourier transform and an important ingredient for many quantum algorithms such as e.g. quantum phase estimation and, in further consequence, Shor's factoring algorithm. The unitary for the QFT on n qubits is given by $$U_{QFT} = \prod_{i=1}^{n} \left[ H(i) \prod_{j=i+1}^{n} CR_{j-i+1}^{(i,j)} \right],$$

where the gates $R_k$ are in this context defined as $$R_k = \begin{pmatrix} 1 & 0 \\ 0 & \exp(2\pi i / 2^k) \end{pmatrix}$$

and the superscripts denote the logical qubits the unitary is acting on. The $CR_k$ gates are consequently controlled-phase gates. For an implementation of the QFT on a square lattice device in the standard gate model, SWAP gates are required to realize the controlled-phase gates. In contrast to that, in the encoding according to the invention, these can be completely removed at the cost of requiring CNOT gates to perform the Hadamard gates according to the decomposition explained for the two-qubit gates. Some gates of the corresponding circuit for a possible low-depth implementation are shown in FIG. 11. The CNOT chains for implementing the logical Hadamard gates can be parallelized apart from a small contribution (the gates which are drawn in FIG. 11). For the logical qubit 0, the first CNOT chain along the line, the Hadamard gate on the data qubit and the second chain until qubit 01 need to be performed before qubit 01 is free to be used in the next line. In general, for any line i, only the gates between the crossing to the previous line [qubit (i−1, i)] and the crossing to the next line [qubit (i, i+1)] contribute to the circuit depth. The necessary logical CPhase gates appear in the circuit as single-qubit $R_z$ rotations (marked with Z). Note that many of them can be merged into other $R_z$ rotations or applied in parallel to other gates and are therefore not shown in FIG. 11. Following that procedure, the operations on the first qubit block n+3 steps. The second and the (n−1)th ones take five steps, and the last one n+2, because there is no CPhase gate required. All other operations in between occupy six time steps. This construction results in a total circuit depth of 8n−9. The circuit depth for this encoding is up to a constant the same as for the standard gate model when assuming all-to-all connectivity. This is remarkable in that this encoding can be implemented in current experiments and does not rely on impracticable hardware requirements.

4. Quantum Addition

Figure 8:
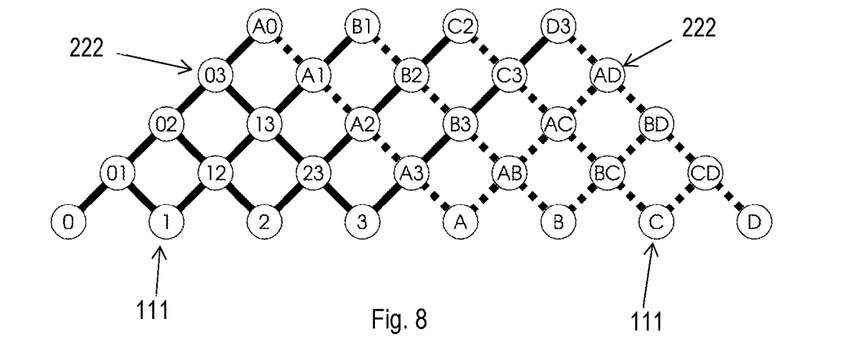
FIG. 8 shows a possible implementation layout for quantum addition with physical qubits.

Another prominent problem in various quantum algorithms is quantum addition as the basic building block of algebraic manipulation of quantum registers. An efficient circuit for the addition of two quantum registers based on the QFT, performs the addition in the Fourier space with conditional rotation gates. Quantum addition (modulo 2n) of two n-qubit quantum states stored in registers R1 and R2 is realized by performing a QFT on one register (say, register R1), then performing controlled $R_z$ rotations between the two registers and finally applying the inverse QFT to the previously Fourier transformed register. On a chip with all-to-all connectivity, the quantum addition algorithm can be implemented in logarithmic depth, neglecting the gates required for performing the necessary QFT-steps. In the encoding according to the invention, the logarithmic-depth part can be performed in a single time step and the linear-depth QFT circuits can be added, without requiring any SWAP gates. As discussed above, the controlled rotations can be implemented with single-qubit operations only, provided the necessary physical qubits are available. A spatial arrangement of physical qubits fulfilling that requirement, would be the two-dimensional square-lattice depicted in FIG. 8. The amount of physical qubits compared to the previously introduced architecture increases by n(n+1), such that there are 3n(n+1)=2 qubits in total. If one of the registers does not require any computations within itself (for example if it represents classical data), the physical qubits corresponding to interactions within that register are not necessary, and the data qubits of the register can be added directly in continuation of the remaining logical lines, requiring n(n+2) qubits in total. Note that either way, the extensions of logical lines hardly affect the circuit depth of the QFT part, as they do not cross any lines corresponding to the other register. The encoding therefore allows to perform the core quantum addition circuit in a single time step, and the surrounding QFT parts with a depth linear in n.

5. Multi-Controlled Gates and Grover's Diffusion Operator

Figure 9:
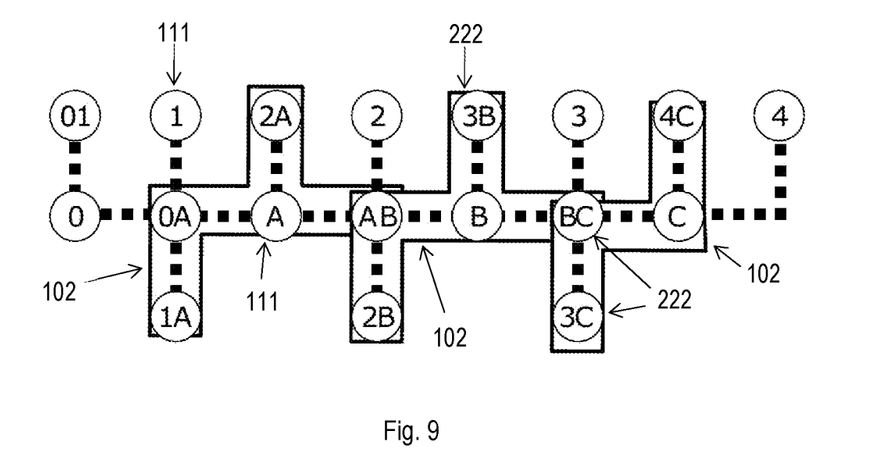
FIG. 9 shows an implementation layout for the n-controlled phase gate using additional ancilla qubits.
Figure 10:
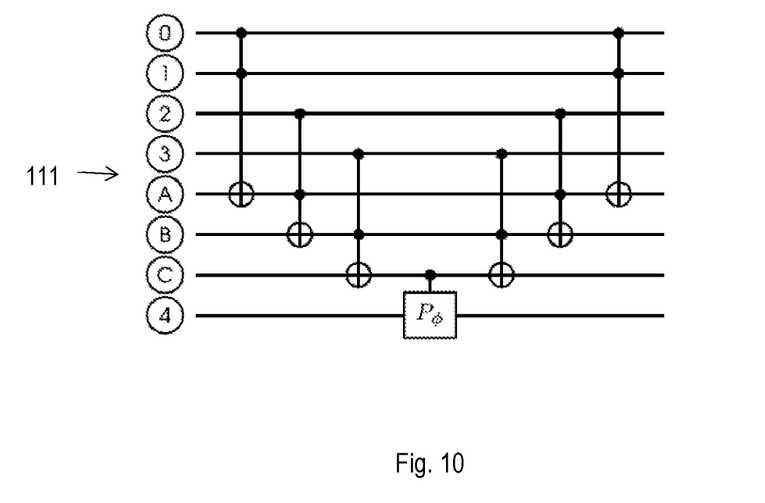
FIG. 10 shows a gate decomposition of a multi-controlled phase gate using ancilla qubits.

A difficulty arising in many quantum algorithms is the implementation of multi-controlled quantum gates, as it requires a considerable number of nonlocal interactions and therefore SWAP gates. In the following, an implementation of the m-controlled phase gate on an encoding with m+1 logical qubits. In Grover's search algorithm, the multi-controlled phase gate is especially relevant for the implementation of the diffusion operator. The diffusion operator on m+1 qubits corresponds to an m-controlled phase gate. The m-controlled phase gate can be decomposed into 2-controlled phase and Toffoli gates. The decomposition is depicted in FIG. 10 and introduces m−1 ancilla qubits, labeled with capital letters. Here, m is the number of control qubits. In the encoding, this allows to implement an m-controlled phase gate with gate resources scaling linearly with m and introducing 4m+3 ancilla qubits in total. Further, it is not necessary to use all physical qubits if the corresponding connections are not required. FIG. 9 shows a possible layout with physical qubits to implement the diffusion operator for m=4.

6. Optimization Problems

Optimization problems can be formulated as energy minimization of Hamiltonians of the form $H_Z = \Sigma_i J_i \sigma_z^{(i)} + \Sigma_{i,j} J_{ij} \sigma_z^{(i)} \sigma_z^{(j)} + \Sigma_{i,j,k} J_{ijk} \sigma_z^{(i)} \sigma_z^{(j)} \sigma_z^{(k)} + \ldots$ with the particular optimization problem being encoded in the pre-factors $J_i, J_{ij}$, etc. Such optimization problems can be tackled on digital, gate-based architectures using the quantum approximate optimization algorithm (QAOA). The QAOA variationally evolves the system with Hamiltonians $$H_X \text{ and } H_Z \text{ as } |\Psi\rangle = \prod_{j=1}^{p} \exp(-i\beta_j H_X)\exp(-i\gamma_j H_Z),$$

where $H_X = \Sigma_i \sigma_x^{(i)}$ is a driver term to explore the search space. While the problem Hamiltonian $H_Z$ can be implemented in the encoding in a single step, the driver Hamiltonian can be realized with a gate sequence of depth 7n−8 analogous to the circuit shown in FIG. 11 (leaving out the $R_Z$ rotations and replacing the physical Hadamard gates by parameterized $R_X$ rotations).

7. Preparation of Graph States

Graph states are an important resource for measurement-based quantum computing as well as for several error correction protocols. Cluster states, corresponding to square grid graphs, can be prepared efficiently using nearest-neighbour interactions. The preparation of more arbitrary graph states, however, typically requires long-range interactions between many different qubits, as it involves applying a CZ gate for every edge in the graph. In the encoding, arbitrary graph states containing n qubits can be created with a circuit depth of at most n+3 and a CNOT-gate count of 2n(n−1) as follows. First n data qubits in the superposition state |+⟩ are prepared. Then the encoding sequence is applied, in either the full version with all possible physical qubits or a reduced version of it, depending on the connectivity requirements of the respective graph, requiring a circuit of depth n+1 or less (for reduced versions). Subsequently, CZ gates are applied to every pair of logical qubits to be connected in the graph, using parallel single-qubit gates on the physical qubits. The result of this is an encoded graph state. For measurement-based quantum computing, which involves measurements of the logical qubits (in arbitrary axes), an additional decoding step of depth n+1 is required. The number of physical qubits required for this procedure is in principle equal to the number of edges in the desired graph state. However, in some cases it can be useful to have additional ancillary qubits to simplify the encoding and decoding circuits.

Summarizing an approach to implement fundamental quantum algorithms for arbitrary system sizes, completely avoiding SWAP gates, is presented. A gate count analysis shows that this implementation has the potential to save multiqubit gates or reduce circuit depth for key constituents of Shor's algorithm. On top of that, due to the redundant encoding of information, the encoding provides an intrinsic potential to detect and correct errors. Further the encoding requires interactions between nearest neighbours only and can thus be implemented on various current NISQ devices with their natural inter-qubit connectivity.

The inventive method and apparatus is also independent of the specific qubit platform. Suitable platforms are for example superconducting qubits, neutral atoms, or trapped ions. In order to complement the error tolerance of the encoding, the use of noise-biased qubits can be considered.

The invention claimed is:

1. A method for executing a quantum algorithm of logical qubits on a quantum system of physical qubits the method comprising:
   a. providing a quantum system comprising a plurality of physical qubits in a spatial arrangement, wherein the number of physical qubits is larger than the number of logical qubits,
   b. encoding the logical qubits into physical qubits, wherein a physical qubit represents either the parity of two or more logical qubits or a single logical qubit, wherein physical qubits in constraint-fulfilling sets fulfil constraints, wherein each constraint-fulfilling set comprises a number of physical qubits such that every logical qubit is represented by zero or an even number of physical qubits in that set,
   c. enable quantum interactions between logical qubits by performing quantum operations on physical qubits,
   d. measuring at least a portion of the physical qubits to obtain a readout.

2. The method of claim 1, wherein the physical qubits in a constraint-fulfilling set are arranged in close physical proximity in the spatial arrangement.

3. The method of claim 1, wherein the physical qubits are arranged in a square lattice.

4. The method of claim 1, wherein the quantum interactions between physical qubits are performed by applying operations out of a universal gate set.

5. The method of claim 1, wherein the method comprises performing error correction on the physical qubits by detecting errors via constraint measurements on physical qubits in a constraint-fulfilling set and depending on the outcomes of the constraint measurements applying operations on a subset of the physical qubits.

6. The method of claim 1, wherein the physical qubits comprise data qubits and/or parity qubits, wherein the number of data qubits is the same as or smaller than the number of logical qubits, wherein the data qubits represent single logical qubits, wherein the parity qubits represent the parity of at least two logical qubits.

7. The method of claim 6, wherein in the encoding the data qubits are initialized in the quantum state of the logical qubits, wherein additional physical qubits are initialized and parity qubits are added to the encoding, wherein a new parity qubit is added by encoding the parity of some physical qubits which form a constraint-fulfilling set with the new parity qubit, onto the new parity qubit.

8. The method of claim 7, wherein the additional physical qubits are initialized in the state |0⟩, wherein a new parity qubit is added to the encoding by applying controlled NOT gates on the new parity qubit from some physical qubits, which form a constraint-fulfilling set with the new parity qubit.

9. The method of claim 7, wherein the additional physical qubits are initialized in the state |+⟩, wherein the physical qubits comprise ancilla qubits initialized in the state |0⟩, wherein a new parity qubit is added to the encoding by applying controlled NOT gates on an initialized ancilla qubit from some physical qubits which form a constraint-fulfilling set with the new parity qubit, and the new parity qubit, and subsequently applying a measurement on the ancilla qubit, wherein depending on the outcome of that measurement a bit-flip operation is applied on the new parity qubit or not.

10. The method of claim 1, wherein the physical qubits are noise-biased qubits.

11. The method of claim 1, wherein n logical qubits are encoded into n(n+1)/2 physical qubits.

12. The method according to claim 1, wherein said quantum algorithm is an algorithm selected from the following algorithms: Shor algorithm, Grover algorithm, Quantum Approximate Optimization Algorithm (QAOA), Variational Quantum Eigensolver (VQE) algorithm, quantum Fourier transform (QFT), Quantum Addition, Harrow, Hassidim, Lloyd (HHL) algorithm, preparation of graph states.

13. The method according to claim 1, wherein the physical qubits comprise ancilla qubits, wherein physical operations and measurements are applied on the ancilla qubits during encoding of the logical qubits into the physical qubits and/or during the implementation of physical interactions between the logical qubits on the physical qubits and/or during error correction on the physical qubits.

14. An apparatus for performing a quantum algorithm of logical qubits comprising:
   a quantum system comprising a plurality of physical qubits in a spatial arrangement;
   a quantum operations unit configured for performing quantum operations on physical qubits corresponding to quantum interactions on the logical qubits,
   a measurement device adapted for measuring at least a portion of the plurality of physical qubits;
   a classical computing system connected to the measurement device and/or the quantum operations unit,
   wherein the apparatus is configured for encoding the logical qubits into the physical qubits such that each physical qubit represents either the parity of two or more logical qubits or a single logical qubit, wherein in the encoding constraint-fulfilling sets of physical qubits fulfil constraints, wherein each constraint-fulfilling set comprises a number of physical qubits such that every logical qubit is represented by zero or an even number of physical qubits in that set.

15. The apparatus according to claim 14, wherein the physical qubits in a constraint-fulfilling set are arranged in close physical proximity in the spatial arrangement.

16. The apparatus according to claim 14, wherein the apparatus further comprises an initialization unit adapted to initialize some or all of the physical qubits in a quantum state.

17. The apparatus according to claim 14, wherein the apparatus is adapted to detect and correct errors, wherein the measurement device is adapted to perform constraint measurements on physical qubits in a constraint-fulfilling set to obtain error syndromes, wherein the classical computing system is adapted to receive and decode the measured error syndromes and determine the actual errors to correct, wherein the quantum operations unit is adapted to apply operations on a subset of the physical qubits according to the decoded error syndromes.

18. The apparatus according to claim 14, wherein the physical qubits are noise-biased qubits.

19. The apparatus according to claim 14, wherein the physical qubits are arranged on a chip.

20. The apparatus according to claim 14, wherein the system is any of a superconducting circuit, a system of one or multiple ion traps, a system of neutral atoms, a system of photons, or a spin system.

* * * * *